May 28, 1957  V. E. PINARD  2,793,665
MACHINE FOR REMOVING BUTT ENDS FROM BRUSSELS SPROUTS
Filed Dec. 21, 1953  3 Sheets-Sheet 2
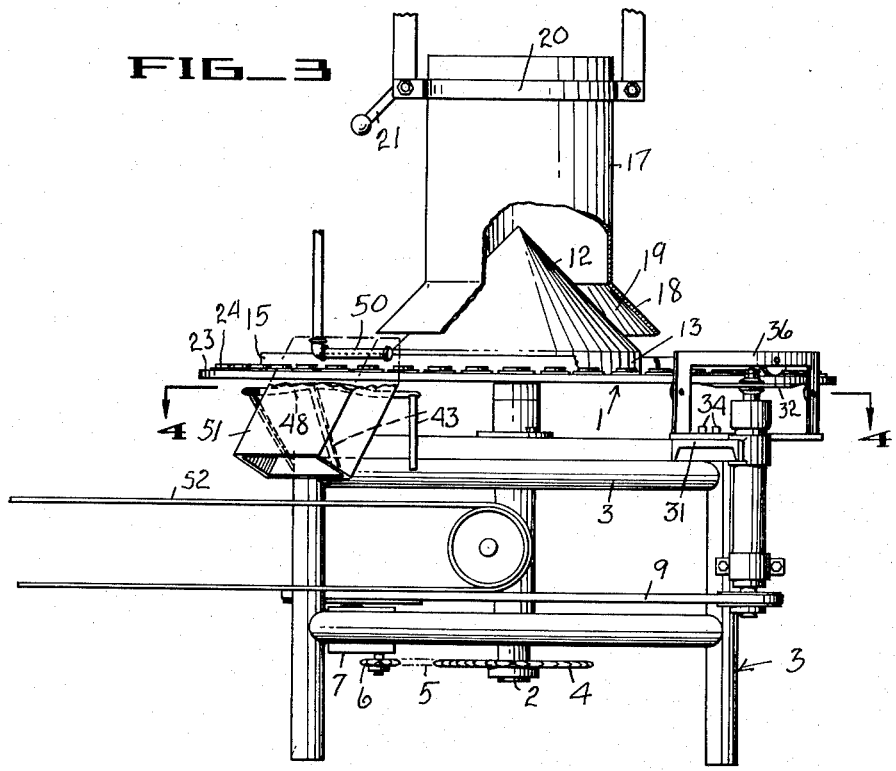
FIG_3
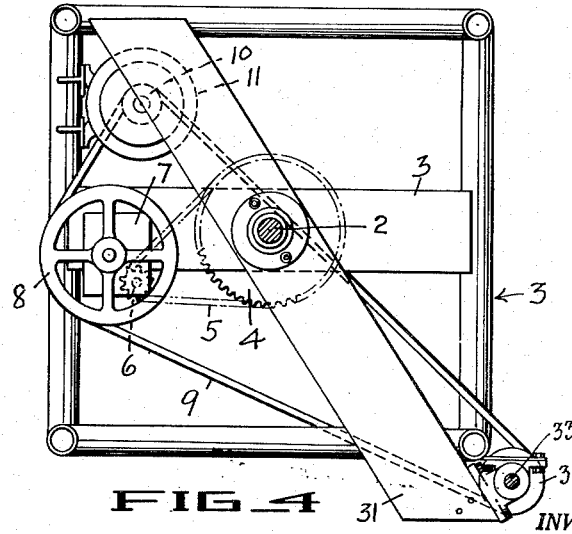
FIG_4
INVENTOR.
VIVIAN E. PINARD
BY
ATTORNEYS May 28, 1957 V. E. PINARD 2,793,665
MACHINE FOR REMOVING BUTT ENDS FROM BRUSSELS SPROUTS
Filed Dec. 21, 1953 3 Sheets-Sheet 3
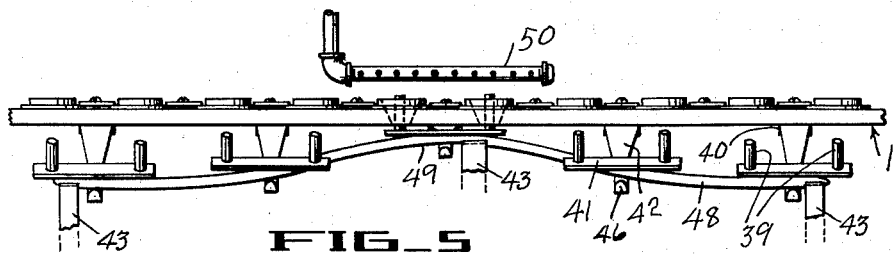
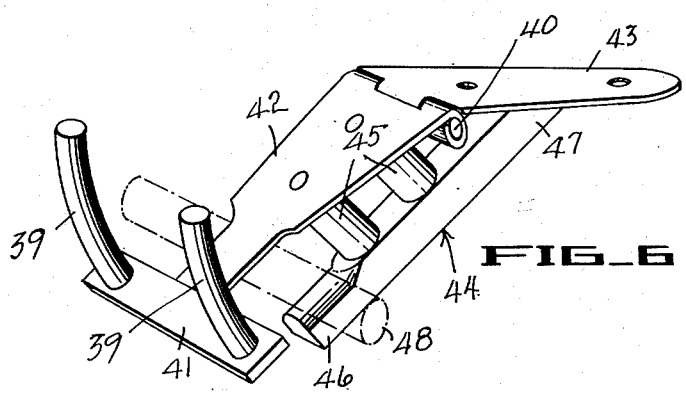
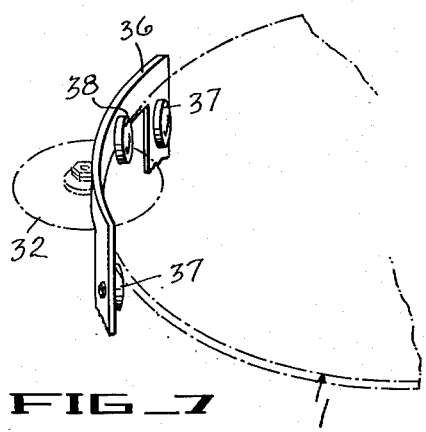
INVENTOR.
VIVIAN E. PINARD
BY
ATTORNEYS

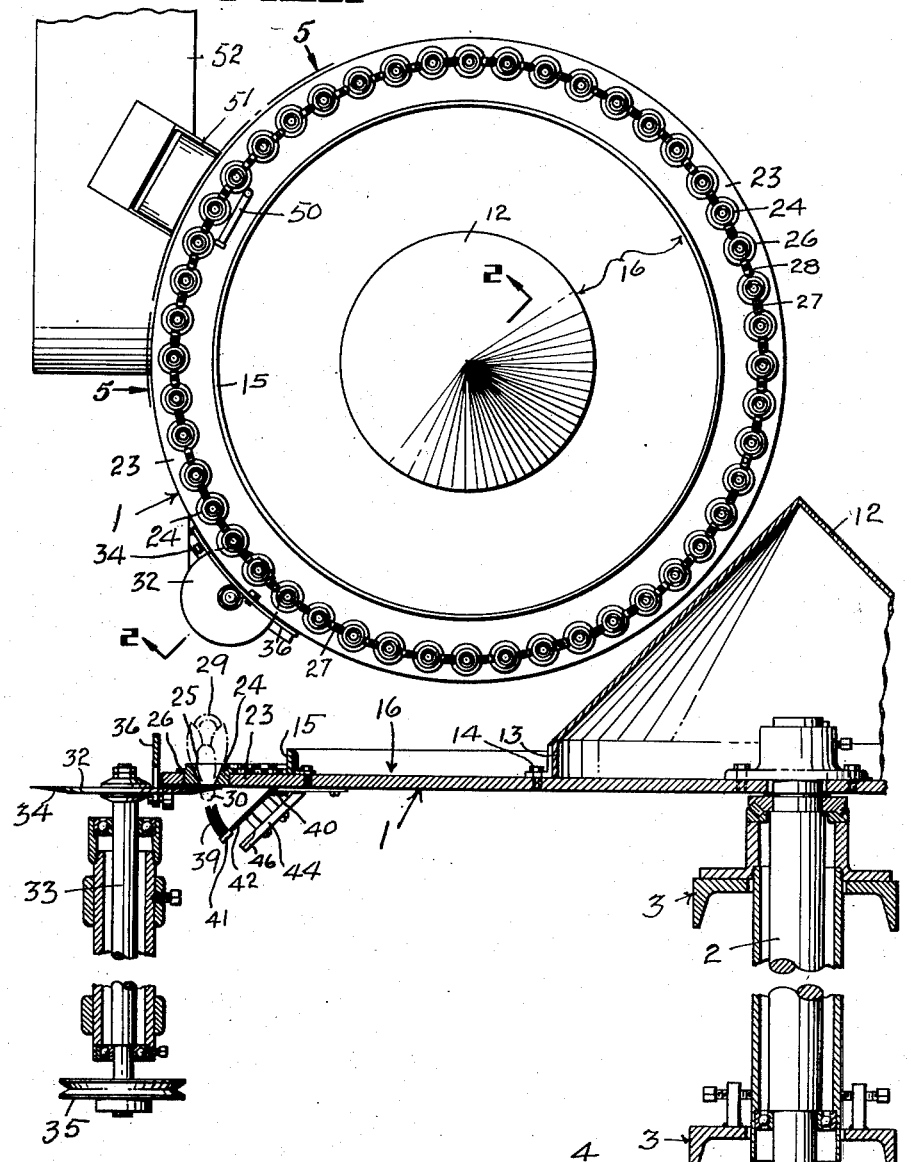

United States Patent Office 2,793,665
Patented May 28, 1957

2,793,665

MACHINE FOR REMOVING BUTT ENDS FROM BRUSSELS SPROUTS

Vivian E. Pinard, San Jose, Calif., assignor to Richmond-Chase Company, San Jose, Calif., a corporation of California Application December 21, 1953, Serial No. 399,540

4 Claims. (Cl. 146—81)

This invention relates to a machine for removing the butt ends from Brussels sprouts preparatory to canning the latter.

In the preparation of Brussels sprouts for canning it is necessary to remove the butt ends of the sprouts including some of the outer leaves of the sprouts so that the heads that are canned will be the relatively light and compact inner leaves of the heads that have the desired color and flavor and with which leaves there is a minimum of stalk. This operation has heretofore been done by cutting off the butt ends by hand. Ordinarily the outer leaves will be cut from the remaining leaves at their butt ends when the butt end of each head is removed, and may either fall from the heads, or can be easily removed therefrom with little force.

This hand operation, particularly where the sprouts are small, is a costly and time consuming operation. An average operator will handle about thirty sprouts per minute.

One of the objects of the present invention is the provision of a machine that will perform substantially the same operation heretofore performed by hand, but more uniformly, and at an increase of about sixty to seventy sprouts per minute. Furthermore with the present invention, an operator who is relatively slow in cutting off the butt ends of sprouts by hand, and who may be able to cut only about twenty to twenty-five, is usually able to perform the operation of from sixty to seventy per minute since the number so cut depends practically entirely upon the number per minute that an operator can position in a simple holder.

Another object of the invention is the provision of a machine for removing the butt ends of Brussels sprouts preparatory to canning the latter, and which machine also will remove the loose leaves resulting from cutting them from the sprout at their butt ends.

A still further object of the invention is the provision of a machine that is provided with a holder for each sprout and a feed means for feeding the sprouts to a point adjacent each holder so that a minimum effort and a minimum amount of time is required for an operator to position a sprout in each holder, and which holder is supported for movement past a cutter with the butt end of the sprout projecting from each holder for severance of said butt end by said cutter.

Other objects and advantages will appear in the description and drawing.

In the drawings,

Fig. 1 is a top plan view of the machine.

Fig. 2 is an enlarged sectional view as seen along line 2—2 of Fig. 1.

Fig. 3 is a side elevational view of the machine of Fig. 1 but with the sprout ejectors omitted for clarity.

Fig. 4 is a sectional view taken along line 4—4 of Fig. 3.

Fig. 5 is a development view substantially as seen from line 5—5 of Fig. 1 showing the operation of the mechanical ejector for ejecting sprouts from the sprout holders.

Fig. 6 is an enlarged perspective view of one of the mechanical sprout ejectors separate from the machine.

Fig. 7 is a perspective view of the stabilizer for the sprout supporting table at the point where the cutter is positioned, the said table and saw being indicated in dot-dash line.

In detail, the said machine as illustrated in the drawing comprises a circular, horizontally disposed table 1 (Figs. 1, 2) that is centrally supported on a rotatable shaft 2 (Fig. 2).

Shaft 2 is supported for rotation in suitable bearings (Fig. 2) carried by a rigid frame 3.

A sprocket wheel 4 is secured to shaft 2, said wheel being connected by a sprocket chain 5 (Figs. 3, 4) with a sprocket wheel 6 on the driven shaft of a variable speed transmission box 7. A pulley 8 is on the drive shaft of said transmission, and a belt 9 connects said pulley 8 with the pulley 10 on the armature shaft of a motor 11 (Fig. 4).

Secured to the table for rotation therewith is an inverted cone 12 that extends over the shaft 2 and is coaxial with the latter. An annular wall or band 13 (Fig. 2) is between the terminating lower edge of the inclined sides of the cone and the table and bolts or screws 14 rigidly secure the wall 13 to said table (Fig. 2), said wall being rigid with the cone as well as with the table.

Coaxial with shaft 2 and spaced outwardly of the cone 12 a substantial distance is an upstanding barrier 15 in the form of an annular upstanding horizontal disposed strip. This barrier is secured rigidly to table 1, and the portion 16 (Figs. 1, 2) of the upper surface of the table between said wall 13 and barrier 15 is the portion onto which Brussels sprouts are fed for manual positioning by operators.

Supported above the table 1 and spaced above and over cone 12 (Fig. 3) is a vertically extending feed tube 17. This tube has an outwardly flared skirt 18 projecting from its lower end, the inclination of which substantially corresponds with that of the slanted side of said cone 12. The space 19 (Fig. 3) between said skirt and said cone is sufficient for Brussels sprouts to pass past the lower free edge of the skirt 18 and onto portion 16 of the table. There is no obstacle above portion 16 and outwardly of skirt 18 to access to sprouts on portion 16.

Inasmuch as the cone will revolve and the skirt 18 is stationary, Brussels sprouts will be continually fed onto the portion 16 in substantially a single layer without bridging in a manner to obstruct or stop the feed of sprouts onto the table, as long as there is space on the table and adjacent to the lower edge of the skirt for the passage of sprouts onto said table. This skirt and tube 17 can be raised and lowered to any desired degree by loosening band 20 through rotation of the nut tightening arm 21 (Fig. 3). Thus the space or passageway between skirt 18 and the cone can be regulated to control the delivery of different sizes of sprouts onto the table. The sprouts are pre-graded before delivery to the tube 17, so once an adjustment is made for one size it may remain that way.

The outer marginal portion 23 (Figs. 1, 2) of the table 1 is provided with an annular row of openings, which row is coaxial with the barrier 15 and axis of shaft 2. In each of said openings is secured a holder 24 (Fig. 2). Each holder 24, in turn, is formed with a central opening having downwardly convergently extending sides 25 that are at substantially an angle 45 degrees relative to the vertical axis of each opening in each holder. The lower side of each holder 24 may be substantially flush with the lower surface of the table 1, and the holder projects above the upper surface of the table. A flange 26 on each holder may rest on the upper side of the table and a bolt or screw 27 (Fig. 1) between the adjacent pairs of holders secures a clamping member 28 over the flanges of said pair of holders thus rigidly holding said holders to said table. The holders can readily be removed and replaced by others of different size, or of the same size, as desired. By "size" reference is made to the diameter of the central opening in each holder, since larger sprouts will require a larger diameter opening, and smaller ones a smaller diameter opening.

Each holder, as described, is adapted to support a sprout 29 (Fig. 2) upright therein with the butt end 30 of each sprout projecting below the table and below the lower side of the holder 24.

The angle of the sides of the opening in each holder, relative to the vertical axis, is important in that said angle substantially corresponds to the angle of the sides of the sprouts that are in frictional engagement with the sides of each holder. By this arrangement the sprouts are capable of being held by said frictional engagement only, not only while the table is rotating, but during the cutting off of the downwardly projecting butt end 30.

At a point around said table is a circular cutting blade 32. This blade is quite thin. In an arrangement such as is illustrated, the diameter of the blade is such that the shaft 33 (Fig. 2) that supports said blade for rotation clears the outer edge of the table, while about half of the blade extends below the table and across the lower surface of each holder so close to said lower surface as to be almost in engagement therewith.

The upper surface of the blade 32 is flat and parallel with the plane in which the lower surface of the holders are disposed, while the underside of said blade along its outer edge is bevelled. This bevel, as seen in Fig. 2 of 34 is quite wide so as to be at a small angle relative to the flat upper side of the blade.

By the above structure, and with the cutting section of the knife moving oppositely to the direction of travel of the table, there is very little resistance to cutting of the butt end 30 by the blade. The bevel on the underside of the blade also tends to exert a slight downward pull on the sprout to prevent its being dislodged from the holder and also, the bevelled surface tends to separate the butt end 30 from the remainder of the sprout.

Blade 32 is relatively thin, being on the order of rotary bread and pastry cutting knives insofar as thinness is concerned, and the abrasive action of the butt end of the sprout 29 on the bevelled side of the blade makes it self sharpening so as to retain an extremely keen edge at all times.

The shaft 33 is supported on the frame of the machine in suitable bearings (Figs. 2, 3) and a pulley 35 on said shaft is adapted to be engaged by belt 9 for rotating said blade at a relatively high rate of speed.

Inasmuch as it is quite important that the edge of blade 32 be uniformly positioned relative to the lower side of holder 24 and to the projecting butt end of each sprout 29, a bracket 36 (Figs. 1, 7) is rigidly secured to the frame of the machine in a position extending horizontally to both sides of the blade 32. This bracket carries two rollers 37 (Fig. 7) that may engage the under side of the outer marginal portion 23 of the table 1 at said both sides of the blade 32, and a single roller 38 may engage the upper side of said marginal portion at a point midway between rollers 37 and over the blade 32. Bracket 36 may be rigidly secured to the diagonally extending member 31 (Fig. 4) of frame 3, in any suitable manner as by bolts 34 (Fig. 3).

By this structure the table will run true at the point where the cutting of the butt ends occurs, irrespective of any tendency of the table to wobble slightly due to worn or loose bearings, warpage or other circumstances that might cause variations in the positions of the holders at the cutting blade.

Carried by the table at its underside, and adjacent to adjacent pairs of holders, are sprout ejectors 39, said ejectors being arranged to operate together in pairs, with one ejector for each holder.

These ejectors 39 are fingers that may be curved to substantially follow the line of an arc about horizontal pivots 40 (Fig. 6). The fingers 39 of each pair may be rigidly connected at their lower ends by a cross bar 41, which bar, in turn, is secured on one end of an arm 42. At the end of arm 42 opposite bar 40 the said arm is swingable about pivot 40, and this pivot is secured by any suitable means, such as a leaf and bolts or screws, to the table 1.

Below arm 42 is a second arm 44 that is rigidly secured to arm 42 by connecting elements 45. The end 46 of second arm 42 nearest cross bar 41 is spaced below arm 42, and the opposite end 47 of said second arm 42 projects from the elements 45 a sufficient distance to form a stop engageable with leaf 43 so as to hold arm 42 in an inclined position with fingers 39 adjacent to but spaced below the lower ends of the holders 24 a sufficient distance to clear the lower projecting butt ends of sprouts 29.

Along the circumferential length of the table 1 and below the same is a stationary cam track 48. In Fig. 5, this cam track and the table and sprout ejectors are shown generally as a development, instead of being arranged along circular lines coaxial with the central shaft 2. Cam tract 48 may be secured to frame 3 by legs 43 (Fig. 3).

This cam track is positioned to be between the end 46 of arm 45 and the portion of the arm 41 thereabove as the table 1 carries each sprout ejectors past the cutter 32. Thus the ejectors will positively be held in the "down," non-ejecting position after the butt ends 29 are cut from sprouts 29. As soon as said butt ends are cut from the sprouts they are thrown outwardly relative to table 1 into any suitable chute, box, etc., for collecting or for delivery away from the machine.

The cam track 48 progressively extends upwardly to provide an elevated section 49 (Fig. 5) and then it extends downwardly again, in the direction of travel of table 1 and of the ejectors. The section 49 is at a point beyond that at which the butts are severed from the sprouts, and the degree of rise in said cam track is sufficient to cause the fingers 39 to move upwardly into each holder to a point substantially level with the upper side of each holder.

Above the table 1 adjacent to the row of holders at the sides of the latter nearest the axis of rotation of said table is a horizontally extending laterally apertured air discharge nozzle 50. This nozzle is provided with a horizontally extending row of discharge apertures along the portion of the table below which the elevated section 49 of the cam track 48 is positioned. The air ejected from these apertures will not only insure the heads of the lifted sprouts being ejected over the outer edge of the table to a chute 51 (Figs. 1, 3) for delivery to a conveyer belt 52, but it, together with the fingers 39, will insure clearing the holders of any of the leaves of the spouts that might otherwise tend to stick in the holders 24, and which leaves will also pass into chute 51 and onto conveyor 52.

The cam track 48 will then positively move the fingers back to lowered position after the holders pass the nozzle 50.

In operation, the operators, which may be any desired number, although three are all that are required for a 48-holder table, are positioned around the table 1 between the point where the holders move past the chute 51 and the cutting blade 32. These operators pick up the sprouts that are carried around the table between the wall 13 and barrier 15 and place them in the holders 24 in positions as indicated by sprout 29 in Fig. 2. The operators usually use both hands, placing a pair of the sprouts at a time in a pair of the holders. By the time the holders are carried to blade 32, they may all be filled, and it has been found that the three operators in a 48-holder table can position sufficient sprouts in the holders to insure 200 sprouts per minute and more, according to the proficiency of the operators, being carried past the cutting blade 32.

It is, of course, obvious that certain modifications in structure can be made without departing from the spirit of the invention, and any such modifications are intended to come within the scope of the claims.

While the present invention is described with specific reference to cutting the butt ends from Brussels sprouts, it is intended to cover any similar use to which it is adapted.

I claim:

1. In a machine for removing the butt end from a Brussels sprout; a horizontally disposed holder for supporting said sprout adjacent to its butt end with the latter projecting downwardly therefrom, a cutter, means supporting said holder and said cutter for movement of one past the other with said cutter positioned to cut off the projecting butt end of a sprout in said holder upon said movement, means for causing said movement, and means for ejecting said sprout from said holder after removal of said butt end by said cutter, said holder being formed with a circular, vertically directed opening having converging sides about its central axis of generally the same inclination relative to said axis as the sides of said sprout adjacent to its butt end for engaging said sides of said sprout with said butt end projecting from the smaller diameter end of said opening, said sides of said opening being unbroken from end to end thereof axially of said opening, said means for ejecting said sprout from said holder including a finger supported for movement into said opening through said smaller diameter end, and said last mentioned means further including a fluid jet positioned adjacent to the larger diameter end of said opening and directed transversely of said axis across said latter end and means for so positioning said means for ejecting said sprout.

2. A machine for removing the butt ends from Brussels sprouts comprising: a circular, horizontally disposed table supported for rotation about its central vertical axis, an annular row of sprout holders concentric with said axis on the outer marginal portion of said table, each of said holders being formed with an opening having sides for supporting a sprout in each opening with its butt end projecting below said marginal portion, a cutter below said marginal portion for cutting the projecting butt ends of said sprouts from the remainders thereof upon rotation of said table and movement of said holders past said cutter, and means adjacent to said cutter for ejecting said sprouts from said holders after the butt ends of said sprouts have been cut from said sprouts, a stationary fluid conduit for fluid under pressure having a discharge opening above said table adjacent to said holders at a point beyond said cutter in the direction of movement of said holders, said discharge opening being directed across the upper ends of the openings in said holders and in a direction generally radially outwardly of the axis of said table for discharge of fluid therefrom against the heads in said holders after the butt ends have been removed from the latter for removing said heads from said table over its outer edge upon the ejection of fluid under pressure from said discharge opening and against said heads.

3. In a machine for removing the butt ends from Brussels sprouts; a circular row of holders disposed in a horizontal plane, means including a circular table supporting said holders for movement about the axis of said table and said row and means for so moving said table and row together, each of said holders being identical and having open upper and lower ends and convergently downwardly extending sides from said upper to said lower ends for supporting an inverted Brussels sprout against said sides with the butt end of said sprout projecting below each holder, a circular, horizontally disposed rotary cutting blade, a support for supporting said blade below and closely adjacent to the lower surface of said holder at the lower end of the latter for successively cutting the butt ends of sprouts adapted to project from said lower ends of said holders, means rigid with said support and in fixed positions relative to said cutting blade engaging the upper and lower sides of said table adjacent to its outer periphery and to said holders and to the cutting blade for guiding said holders in a fixed path past said cutting blade.

4. In a machine for removing the butt ends from Brussels sprouts; a circular row of holders disposed in a horizontal plane, means including a circular table supporting said holders for movement about the axis of said table and said row and means for so moving said table and row together, each of said holders being identical and having open upper and lower ends and convergently downwardly extending sides from said upper to said lower ends for supporting an inverted Brussels sprout against said sides with the butt end of said sprout projecting below each holder, a circular, horizontally disposed rotary cutting blade, a support for supporting said blade below and closely adjacent to the lower surface of said holder at the lower end of the latter for successively cutting the butt ends of sprouts adapted to project from said lower ends of said holders, means rigid with said support and in fixed positions relative to said cutting blade engaging the upper and lower sides of said table adjacent to its outer periphery and to said holders and to the cutting blade for guiding said holders in a fixed path past said cutting blade, and separate means beyond said cutting blade in the direction of movement of said holders for ejecting sprouts from said holders in a vertical direction and in a laterally outward, direction relative to said axis.

References Cited in the file of this patent

UNITED STATES PATENTS

| | | |
|---|---|---|
| 686,875 | Wolff | Nov. 19, 1901 |
| 1,924,678 | Curtiss | Aug. 29, 1933 |
| 2,550,785 | Crosset | May 1, 1951 |
| 2,617,461 | Bach | Nov. 11, 1952 |
| 2,621,692 | Urschel et al. | Dec. 16, 1952 |
| 2,638,949 | Blevins et al. | May 19, 1953 |
| 2,643,694 | Ashlock | June 30, 1953 |